US009733393B2

(12) United States Patent
Liu et al.

(10) Patent No.: US 9,733,393 B2
(45) Date of Patent: Aug. 15, 2017

(54) LIGHT-REFLECTIVE STRUCTURES AND METHODS FOR THEIR MANUFACTURE AND USE

(75) Inventors: Xiang Yang Liu, Botannia (SG); Ying Ying Diao, Singapore (SG)

(73) Assignee: National University of Singapore, Singapore (SG)

( * ) Notice: Subject to any disclaimer, the term of this patent is extended or adjusted under 35 U.S.C. 154(b) by 1058 days.

(21) Appl. No.: 13/148,208

(22) PCT Filed: Feb. 24, 2011

(86) PCT No.: PCT/SG2011/000075
§ 371 (c)(1),
(2), (4) Date: Aug. 5, 2011

(87) PCT Pub. No.: WO2012/115591
PCT Pub. Date: Aug. 30, 2012

(65) Prior Publication Data
US 2012/0218653 A1      Aug. 30, 2012

(51) Int. Cl.
| G02B 1/00 | (2006.01) |
| G02B 6/122 | (2006.01) |
| D06P 5/08 | (2006.01) |
| D06M 10/00 | (2006.01) |
| D06M 15/15 | (2006.01) |
| D06M 15/233 | (2006.01) |
| D06M 23/08 | (2006.01) |
| B82Y 20/00 | (2011.01) |

(Continued)

(52) U.S. Cl.
CPC .............. *G02B 1/005* (2013.01); *B82Y 20/00* (2013.01); *D06M 10/001* (2013.01); *D06M 15/15* (2013.01); *D06M 15/233* (2013.01); *D06M 23/08* (2013.01); *D06P 5/08* (2013.01); *G02B 6/1225* (2013.01); *D06P 3/04* (2013.01); *G02B 5/08* (2013.01)

(58) Field of Classification Search
CPC ....................................................... G02B 1/005
See application file for complete search history.

(56) References Cited

U.S. PATENT DOCUMENTS 2,070,243 A * 2/1937 Stern ........................ D03D 1/00
139/428
6,037,280 A    3/2000 Edwards et al.
(Continued)

FOREIGN PATENT DOCUMENTS

| AU | 742112 B2 | 12/2001 |
| AU | 9533301 A | 4/2002 |

(Continued)

OTHER PUBLICATIONS

Agnarsson et al., Spider silk as a novel high performance biomimetic muscle driven by humidity, *The Journal of Experimental Biology* (Apr. 15, 2009), 212:1990-1994.
(Continued)

*Primary Examiner* — Alex A Rolland
(74) *Attorney, Agent, or Firm* — Pepper Hamilton LLP

(57) ABSTRACT

Light-reflective materials and methods for their preparation and use are described. The materials can have multiple particles or voids arranged in a crystal structure. The materials can reflect various types of light such as visible light, ultraviolet light, or infrared light.

9 Claims, 15 Drawing Sheets

(51) Int. Cl.
D06P 3/04 (2006.01)
G02B 5/08 (2006.01)

(56) References Cited

U.S. PATENT DOCUMENTS

| | | | |
|---|---|---|---|
| 6,409,907 | B1 | 6/2002 | Braun et al. |
| 6,756,115 | B2 | 6/2004 | Fu et al. |
| 6,939,362 | B2 | 9/2005 | Boyle et al. |
| 7,045,195 | B2 | 5/2006 | Ozin et al. |
| 7,221,512 | B2 | 5/2007 | Steenblik |
| 7,247,349 | B2 | 7/2007 | Ozin et al. |
| 7,527,829 | B2 | 5/2009 | Yoshida et al. |
| 7,616,376 | B2 | 11/2009 | Arsenault et al. |
| 7,758,919 | B2 | 7/2010 | Ozin et al. |
| 8,669,325 | B1 | 3/2014 | Hyman |
| 8,921,473 | B1 | 12/2014 | Hyman |
| 2002/0045030 | A1 | 4/2002 | Ozin et al. |
| 2002/0062782 | A1* | 5/2002 | Norris et al. ............ 117/3 |
| 2002/0143873 | A1 | 10/2002 | Lamp |
| 2003/0100917 | A1 | 5/2003 | Boyle et al. |
| 2004/0053009 | A1 | 3/2004 | Ozin et al. |
| 2005/0075663 | A1 | 4/2005 | Boyle et al. |
| 2006/0182968 | A1 | 8/2006 | Yoshida et al. |
| 2007/0196571 | A1 | 8/2007 | Ozin et al. |
| 2009/0047352 | A1* | 2/2009 | Butler et al. ............ 424/489 |
| 2009/0075038 | A1 | 3/2009 | Butler et al. |
| 2009/0133605 | A1 | 5/2009 | Butler et al. |
| 2010/0040741 | A1 | 2/2010 | Butler et al. |
| 2010/0239620 | A1 | 9/2010 | Butler et al. |
| 2010/0298504 | A1 | 11/2010 | Janczewski et al. |
| 2011/0014380 | A1* | 1/2011 | Fudoji et al. ............ 427/356 |
| 2011/0135697 | A1* | 6/2011 | Omenetto et al. ....... 424/400 |
| 2012/0218653 | A1 | 8/2012 | Liu et al. |
| 2013/0075676 | A1 | 3/2013 | Purdy et al. |
| 2014/0334005 | A1 | 11/2014 | Omenetto et al. |

FOREIGN PATENT DOCUMENTS

| | | |
|---|---|---|
| AU | 2002341977 A1 | 6/2003 |
| BR | PI0608708 A2 | 10/2010 |
| CA | 2282402 A1 | 10/1998 |
| CA | 2426105 A1 | 4/2002 |
| CA | 2600356 A1 | 9/2006 |
| CN | 1833184 A | 9/2006 |
| CN | 101175465 A | 5/2008 |
| CN | 100456056 C | 1/2009 |
| CN | 101360795 A | 2/2009 |
| CN | 101583674 A | 11/2009 |
| CN | 101754999 A | 6/2010 |
| EP | 0970272 A1 | 1/2000 |
| EP | 1339897 A2 | 9/2003 |
| EP | 1653256 A1 | 5/2006 |
| EP | 1858479 A2 | 11/2007 |
| EP | 1948739 A1 | 7/2008 |
| EP | 2158259 A1 | 3/2010 |
| JP | 09-087964 | 5/1994 |
| JP | H09-087964 A | 3/1997 |
| JP | 2000-233998 | 8/2000 |
| JP | 2000-233998 A | 8/2000 |
| JP | 2002-527335 A | 8/2002 |
| JP | 2004-098414 A | 4/2004 |
| JP | 2005060653 A | 3/2005 |
| JP | 2005060654 A | 3/2005 |
| JP | 2005-516130 A | 6/2005 |
| JP | 2005-516254 A | 6/2005 |
| JP | 2010-532738 | 10/2010 |
| JP | 2010-532738 A | 10/2010 |
| KR | 20060113645 A | 11/2006 |
| RU | 2007138102 A | 4/2009 |
| RU | 2008124905 A | 12/2009 |
| WO | WO 98/42909 A1 | 10/1998 |
| WO | WO 02/33461 A2 | 4/2002 |
| WO | WO2005012961 A1 | 2/2005 |
| WO | WO 2006/097332 A2 | 9/2006 |
| WO | WO2007/005746 A1 | 5/2007 |
| WO | WO 2007/057146 A1 | 5/2007 |
| WO | WO2008/031720 A1 | 3/2008 |
| WO | WO 2008/141973 A1 | 11/2008 |
| WO | WO2008141971 A2 | 11/2008 |
| WO | WO2009/027172 A1 | 3/2009 |
| WO | WO 2009/038544 A1 | 3/2009 |
| WO | WO2009/061823 A1 | 5/2009 |
| WO | WO 2009119677 A1 * | 10/2009 |
| WO | 2011156586 A2 | 12/2011 |
| ZA | 200707903 A | 12/2008 |
| ZA | 200803891 A | 9/2009 |
| ZA | 200901703 A | 6/2010 |

OTHER PUBLICATIONS

Altman et al., Silk-based biomaterials, *Biomaterials* (Jun. 19, 2002), 24:401-416.

Arsenault et al., A polychromic, fast response metallopolymer gel photonic crystal with solvent and redox tunability: a step towards photonic ink (P-Ink), *Advanced Materials* (Mar. 2003), 15(6):503-507.

Arsenault et al., Photonic-crystal full-colour displays, *Nature Photonics* (Aug. 2007), 1:468-472.

Ashcroft et al., Solid State Physics, Saunders College Publishing (New York, 1976) (TOC).

Banerjee et al., Optical characterization of iridescent wings of *Morpho* butterflies using a high accuracy nonstandard finite-difference time-domain algorithm, *Optical Review* (Jul. 30, 2007), 14(6):359-361.

Berthier, Iridescences: The Physical Colours of Insects, *American Entomologist* (2007), 54(3):184-187.

Bogomolov et al., Photonic band gap phenomenon and optical properties of artificial opals, *Physical Review E* (Jun. 1997), 55(6): 76197625.

Briscoe et al., Positive selection of a duplicated UV-sensitive visual pigment coincides with wing pigment evolution in *Heliconius* butterflies, *PNAS* (Feb. 23, 2010), 107(8):3628-3633.

Chen et al., Iridescent large-area $ZrO_2$ photonic crystals using butterfly as templates, *Appl. Phys. Lett.* (Feb. 2, 2009), 94:053901-053903.

Diad et al., Mysterious colouring: structural origin of colour mixing for two breeds of Papilio butterflies, *Optics Express* (Apr. 26, 2011), 19(10):9232-9241.

Diao et al., Bring Structural Color to Silk Fabrics, *Advanced Materials Research* (2012), 441:183-186.

Diao, Bring Structural Color to Silk Fabrics, Biophysics, Department of Physics, National University of Singapore (Jun. 11, 2010), pp. 1-19.

Du et al., Design of superior spider silk: From nanostructure to mechanical properties, *Biophys J* (Dec. 15, 2006), 91(12):4528-4535.

Economou et al., Classical Wave-Propagation in Periodic Structures—Cermet Versus Network Topology, *Phys Rev B* (1993), 48(18):13434-13438.

Finlayson et al., Ordering in stretch-tunable polymeric opal fibers, *Optics Express* (Feb. 14, 2011), 19(4):3144-3154.

Fudouzi, Tunable structural color in organisms and photonic materials for design of bioinspired materials, *Sci Technol Adv Mater* (Dec. 28, 2011), 12:1-7.

Ge et al., One-step preparation of polystyrene colloidal crystal films with structural colours and high hydrophobicity, *Thin Sold Films* (Dec. 5, 2008), 515(4):1539-1543.

Ge et al., Responsive photonic crystals, *Angewandte Chemie International Edition* (Jan. 20, 2011), 50(7):1492-1522.

Gobin et al., Structural and mechanical characteristics of silk fibroin and chitosan blend scaffolds for tissue regeneration, *Journal of Biomedical Materials Research Part A* (Jun. 27, 2005), 74A(3):465-473.

Gupta et al., A Facile Fabrication Strategy for Patterning Protein Chain Conformation in Silk Materials, *Advanced Materials* (Sep. 3, 2009), 22(1):115-119.

Jiang et al., Mechanical properties of robust ultrathin silk fibroin films, *Adv. Funct. Mater.* (2007), 17:2229-2237.

(56) References Cited

OTHER PUBLICATIONS

Joannoupoulos et al., Photonic crystals: Molding the flow of light, *Cloth* (1995), p. 184.
Johnson et al., Synthesis and optical properties of opal and inverse opal photonic crystals, *Synthetic Metals* (2001), 116:469-473.
Kim et al., Humidity Sensors Mimicking Cuticle of Hercules Beetles, *IEEE Sensors 2010 Conference* (2010), pp. 805-808.
Kim et al., Structural colour printing using a magnetically tunable and lithographically fixable photonic crystal, *Nature Photonics* (2009), pp. 1-18.
Kinoshita, Structural Colors in the Realm of Nature, World Scientific Publishing Co. Pt. Ltd. (Singapore, 2008).
Kolle et al., Mimicking the colourful wing scale structure of the Papilio blumei butterfly, *Nature Nanotechnology* (May 30, 2010), 5:511-515.
Lawrence et al., Bioactive silk protein biomaterial systems for optical devices, *Biomacromolecules* (Mar. 28, 2008), 9(4):1214-1220.
Li et al., Structural origin of the brown colour of barbules in male peacock tail feathers, *Phys. Rev. E* (Jul. 11, 2005), 72(1):010902-010905.
Lim et al., Sex-specific UV and fluorescence signals in jumping spiders, *Science* (Jan. 26, 2007), 315:481.
Liu et al., Structural colour change in longhorn beetles *Tmesisternus isabellae*, *Optics Express* (Aug. 31, 2009), 17(18):16183-16191.
Nakamae et al., Elastic-Modulus of the Crystalline Regions of Silk Fibroin, *Polymer* (Jul. 1989), 30(7):1243-1246.
Perry et al., Nano- and micropatterning of optically transparent, mechanically robust, biocompatible silk fibroin films, *Advanced Materials* (Jul. 7, 2008), 20:3070-3072.
Sah et al., Preparation, characterization and in vitro study of biocompatible fibroin hydrogel, *African Journal of Biotechnology* (Aug. 2, 2011), 10(40):7878-7892.
Schmidt et al., Interference effect pigments—new technologies in cosmetics products, *SOFW Journal* (2010), 136:42-48.
Takeuchi et al., Colour discrimination at the spatial resolution limit in a swallowtail butterfly, *Papilio xuthus*, *The Journal of Experimental Biology* (2006), 209:2873-2879.
Velev et al., Structured porous materials via colloidal crystal templating: From inorganic oxides to metals, *Advanced Materials* (2000), 12(7):531-534.
Vollrath et al., Liquid crystalline spinning of spider silk, *Nature* (Mar. 29, 2001), 410:541-548.
Vos et al., Strong effects of photonic bands structures on the diffraction of colloidal crystals, *Physical Review B* (Jun. 16, 1996), 53(24):16231-16235.
Vukusic et al., Structural colour: Colour mixing in wing scales of a butterfly, *Nature* (Mar. 30, 2000), 404:457.
Vukusic et al., Sculpted-multilayer optical effects in two species of Papilio butterfly, *Applied Optics* (2001), 40(7):1116-1125.
Wang et al., Bioinspired Colloidal Photonic Crystals with Controllable Wettability, *Acc. Chem. Res.* (Mar. 14, 2011), 44(6):405-415.
Wang et al., Fabrication of polyaniline inverse opals via templating ordered colloidal assemblies, *Advanced Materials* (Mar. 2001), 13(5):350-354.
Xie et al., Controllable Epitaxial Crystallization and Reversible Oriented Patterning of Two-Dimensional Colloidal Crystals, *J Am Chem Soc* (2009), 131: 4976-4982.
Yoshioka et al., Coloration using higher order optical interference in the wing pattern of the Madagascan sunset moth, *J. R. Soc. Interface* (Nov. 13, 2007), 5:457-464.
International Search Report and Written Opinion dated Apr. 19, 2011 for PCT/SG2011/000075.
Amsden, et al. "Spectral Analysis of Induced Color Change on Periodically Nanopatterned Silk Films" Nov. 9, 2009, *Optics Express* 17(23):21271-21279.
Berger "Peacock feathers and butterfly wings inspire bio-templated nanotechnology materials" Aug. 15, 2008, *Nano Werk* (nanowerk.com/ . . . /spotid=6760.php—printed Jun. 22, 2010).
Choi et al. "Chitosan-Based Inverse Opals: Three-Dimensional Scaffolds with Uniform Pore Structures for Cell Culture" Apr. 15, 2009 *Adv. Mater* 21(29):2997-3001.
Omenetto et al. "A new route for silk" 2008, *Nature Photonics* 2:641-643 (abstract).
Ultrafast Nonlinear Optics and Biophotonics Laboratory: Structural color and photonic crystals (downloaded from http://ase.tufts.edu/biomedical/unolab/structural.html on Jun. 24, 2010).
Huang et al. "Controlled replication of butterfly wings for achieving tunable photonic properties" 2006, American Chemical Society, *Nano letters* 6(10):2325-2331.
Wijnhoven et al. "Preparation of photonic crystals made of air spheres in titania" Aug. 7, 1998, *Science* 281:802-804.
Vos et al. "Higher order Bragg diffraction by strongly photonic fcc crystals: onset of a photonic bandgap" 2000, Elsevier Science B.V., *Physics Letters* A 272:101-106.
Zi, et al. "Coloration strategies in peacock feathers" Oct. 28, 2003, *PNAS USA* 100(22):12576-12578.
Diad et al., Bring Structural Color to Silk Fabrics, *Advanced Materials Research* (Jan. 2012), 441:183-186.
Kinoshita et al., Structural Colors in Nature: The Role of Regularity and Irregularity in the Structure, *Chemphyschem* (Aug. 12, 2005), 6(8):1442-1459.
Sah et al., Regenerated Silk Fibroin from B. mori Silk Cocoon for Tissue Engineering Applications, *International Journal of Environmental Science and Development* (Dec. 2010), 1(5):404-408.

* cited by examiner (a)

(b)

(a)

(b)

(a) (b)

(a)

(b)

LIGHT-REFLECTIVE STRUCTURES AND METHODS FOR THEIR MANUFACTURE AND USE

CLAIM OF PRIORITY

This application claims priority to PCT Application No. PCT/SG2011/000075, filed Feb. 24, 2011, which is incorporated herein by reference in its entirety.

TECHNICAL FIELD

The present disclosure relates generally to light reflective structures and methods for their manufacture and use.

BACKGROUND

Photonic crystals (PCs) are materials with a periodic modulation in refractive index. If the band-gap of a photonic crystal is located at a visible wavelength, the photonic crystals can produce so-called "structural colors". Current research in the field is directed at structural colors and their related properties (such as properties arising in the wavelength ranges of ultraviolet (UV) light, visible light, and infrared (IR) light) using both inorganic and organic materials. Thus, there is a need for photonic crystals that can be bio-compatible and/or bio-degradable, for example.

Furthermore, with reference to the textile industry, it is known that coloring or dyeing of fabrics and especially silk fabrics is challenging. In addition, color fading due to leaching or oxidation/bleaching is a typical problem in the industry. There are also significant challenges for placing structural colors on fabric. One problem is that structural colors typically do not spread well on fabric. Another problem is that structural colors typically do not adhere to fabric.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

In one aspect, a light-reflective material is described. The material can include a solid substrate, and multiple particles or voids assembled in a crystal structure on the substrate. The size of the particles can be selected based upon at least one desired reflected light wavelength of the light-reflective material. The light-reflective material can also include various other materials such as at least one binding material and at least one coating material. The light-reflective material can include an opal structure or an inverse opal structure.

In an alternative aspect, a method of preparing a light-reflective material is described. The method can include providing a solid substrate, and assembling multiple particles in a crystal structure on the substrate. The size of the particles can be selected based upon at least one desired reflected light wavelength of the light-reflective material. The method can further include additional steps such as increasing the hydrophilicity of the material, applying a binding material, and applying a coating material.

DETAILED DESCRIPTION

Figure 1:
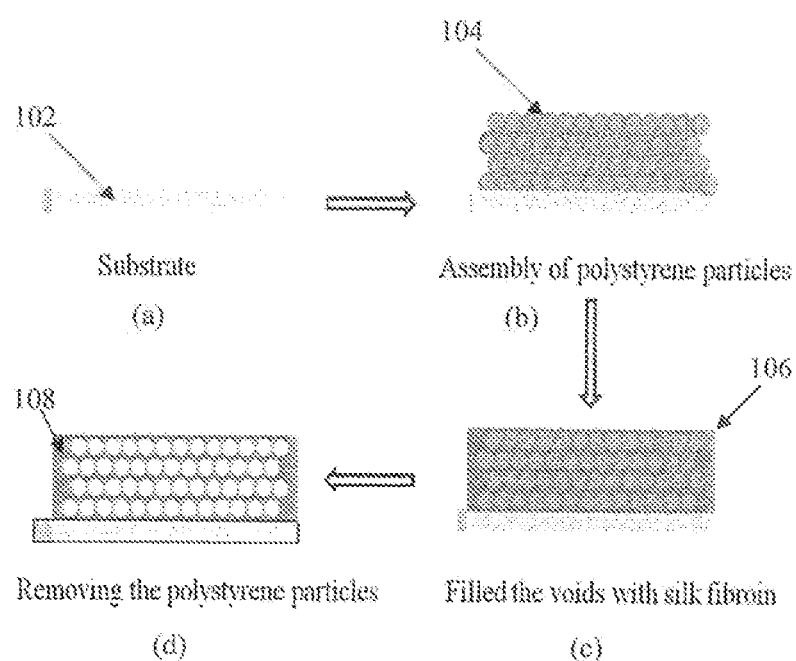
FIG. 1 is a schematic flow diagram illustrating fabrication of a silk fibroin opal structure in an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The term "structural color" can include light or electromagnetic radiation having at least one wavelength in the infrared, visible, or ultraviolet range.

The term "opal structure" refers to spheres of fairly regular size, packed into close-packed planes that are stacked together with characteristic dimensions of several hundred nanometers. The term "inverse opal structure" refers to an opal structure where the arrayed items have been removed to leave spherical voids, cavities, or air spheres in their place. The spherical void spaces are close-packed and surrounded by solid walls.

Compositions

Various embodiments of the invention are directed towards light-reflective materials. The materials can comprise a solid substrate, and multiple particles assembled in a crystal structure contacting the solid substrate. The materials can further comprise a binding material disposed within the crystal structure in voids between the multiple particles. The materials can further comprise a coating layer covering or partially covering the crystal structure. The materials can comprise an opal structure or an inverse opal structure. For materials comprising an inverse opal structure, the multiple particles are no longer present in the materials. In other words, the light-reflective material can comprise a solid substrate, and multiple voids, cavities, or air spheres assembled in a crystal structure contacting the solid substrate.

As the light-reflective materials do not contain traditional dyes or pigments, they exhibit superior durability and resistance to fading. Their manufacture also does not involve the toxic chemicals or large quantities of water typically used in conventional dyeing methods. Therefore, such light reflective materials are non-toxic. Furthermore, structural colours provided by such light reflective materials are brighter and more deeply saturated than those colours typically arising from traditional pigments. Moreover, structural colours provided by such light reflective materials often possess additional unique visual properties, such as polarization, iridescent and angle-dependent visibility.

The solid substrate can generally be any solid substrate. The solid substrate can generally have any size and shape. Example forms of the solid substrate include a film, foam, coating, sponge, or fiber. The solid substrate can generally be a one-dimensional shape, a two-dimensional shape, or a three-dimensional shape. The solid substrate can be one dimensional such as a fiber or string. The solid substrate can be two dimensional such as a sheet, flat surface, or fabric. The solid substrate can be three dimensional such as a mesh. The solid substrate can be a fiber or fabric. The fabric can be made of one or multiple fibers. The fiber or fabric can include or be bio, natural, or synthetic types, i.e., cotton, polyester, nylon, Dacron, Spandex, silk, etc.

The substrate can have a hydrophobic surface or a hydrophilic surface. In some embodiments with particular combinations of solid substrate and multiple particles, a hydrophilic surface may make assembly of the crystal structure easier.

The multiple particles are generally spherical in shape, but can have any shape. The multiple particles are uniform in size and shape. The multiple particles can have diameters of about 100 nm to about 1,000 nm. Specific examples of diameters include about 100 nm, about 200 nm, about 300 nm, about 400 nm, about 500 nm, about 600 nm, about 700 nm, about 800 nm, about 900 nm, about 1,000 nm, and ranges between any two of these values.

The light-reflective material can reflect one or more wavelengths of light. For example, the desired reflected light wavelength can be at least one visible light wavelength, at least one ultraviolet light wavelength, at least one infra-red light wavelength, or combinations thereof.

The diameter of the multiple particles can impact, or can be selected to impart a particular light-reflective property to the light-reflective material. For example, light-reflective materials made from multiple particles of one size may reflect visible light of a first color, while different light-reflective materials made from multiple particles of a second size may reflect visible light of a second color. Light-reflective materials made from multiple particles of a third size may reflect, infrared or ultraviolet light. The light-reflective materials can appear colored to the eye. For example, the light-reflective materials can appear red, orange, yellow, green, blue, indigo, or violet in color. The light-reflective materials can appear uniform when viewed from multiple angles, or can appear to have different colors or patterns when viewed from multiple angles.

The multiple particles can generally be made of any substance. For example, the multiple particles can be organic or inorganic. For materials having inverse opal structures, the multiple particles are desirably be made of a substance that can be easily removed from an opal structure to produce the inverse opal structure. The multiple particles can be made of at least one polymer. Example polymers include polystyrene, protein and other polymers obtained from polymer solutions such as polystyrene-b-poly(2-vinylpyridine) (PS-P2VP) solution, epoxy resin etc. The multiple particles can be made of silica, titania, zinc oxide etc. In some embodiments, the multiple particles can be made of or contain a biodegradable substance. In some embodiments, the multiple particles can be soluble in at least one solvent or solvents.

The multiple particles can generally be arranged in any crystal structure. The crystal structure can be two or three-dimensional, including two or more layers of the multiple particles. An example of a crystal structure is a face-centered-cubic structure ("FCC"), a hexagonal close packed structure ("HCP"), a body centered cubic structure, a simple cubic structure or any other periodic structures.

The binding material can fully or at least partially fill the spaces surrounding the multiple particles or voids, cavities, or air spheres. The binding material can improve the structural integrity of the structure. The binding material can substantially bind the crystal structure to the substrate. The binding material can generally be any substance. For example, the binding Material can include at least one polymer. The binding material can contain a protein or multiple proteins. The binding material can be a mixture of one or more polymers and one or more proteins. An example of a binding material is silk fibroin. In some examples, the binding material is soluble in water. Other solvents can include SU-8 photoresist (an epoxy-based negative photoresist), ultraviolet (UV) cure resin etc.

In some embodiments, the coating layer can reduce color fading, and/or protect the opal or inverse opal structure from physical damage, relative to the same material lacking the coating layer. The coating layer can generally be made of any substance. The coating layer can be organic or inorganic. The coating layer can be made of at least one polymer. In some embodiments, the coating layer and the solid substrate can be made of the same material. For example, the coating layer and the solid substrate can both be silk or can both be polyester. The coating layer may also include material made of silica, titania, PMMA (Poly-methyl methacrylate) etc. In some embodiments, the coating layer and the binding material can be made of the same material. For example, the coating layer and the binding material can both be silk fibroin. In some examples, the coating layer material is soluble in water. Other solvents can include polystyrene-b-poly(2-vinylpyridine) (PS-P2VP) solution, epoxy resin etc. Alternatively, through a chemical reaction or sol-gel process, titania or silica inverse opals can also be synthesized.

Methods of Manufacture

Additional embodiments of the invention are directed towards methods for the manufacture of light-reflective materials. The methods can include providing a solid substrate, and contacting the solid substrate and multiple particles to assemble the particles in a crystal structure on the solid substrate. The method can further comprise treating the solid substrate to increase the hydrophilicity of the solid substrate prior to the contacting step. The treatment, in some examples, can result in the substrate becoming hydrophilic.

The method can further comprise selecting a size of the multiple particles based on a desired reflected light wavelength of the light-reflective material. The desired reflected light wavelength can be at least one visible light wavelength, at least one ultraviolet light wavelength, at least one infrared light wavelength, or combinations thereof. The method can further comprise selecting a size of the multiple particles based on the refractive index of the binding material whereby the reflected light wavelength (band gap) is related to the lattice constant (related to the diameter of the multiple particles) and refractive index of the binding material. Given the desired reflected light wavelength, the diameter of the particles can be determined. For example, for polystyrene (refractive index n=1.59) colloid crystals, $\lambda=a/0.6$ and $a=\sqrt{2}*d$, where $\lambda$ is the reflected light wavelength, and d is the particles' diameter. The resultant silk fibroin inverse opals have two stop bands, and as a result, there are two reflected light wavelengths.

The contacting step can comprise dispersing or suspending the multiple particles in a solvent to form a dispersion, suspension, or colloid, applying the dispersion, suspension, or colloid to the solid substrate, and allowing the solvent to evaporate. In some embodiments, allowing the solvent to evaporate can include heating the solvent, applying a vacuum to the solvent, or both. The formed crystal structure can have a face-centered-cubic ("FCC") structure, a hexagonal close packed structure ("HCP"), a body centered cubic structure, a simple cubic structure or any other periodic structures. The formed crystal structure can be formed based on convective self-assembly.

The method can further comprise applying a binding material to the crystal structure to form an opal structure. The binding material can be applied such that it partially or fully fills voids surrounding the multiple particles in the crystal structure. The binding material can be applied such that the multiple particles are substantially bound to the solid substrate.

The method can further comprise applying a second binding material over the crystal structure. The second binding material can be the same or different from the first binding material. The second binding material can be applied after the application of the first binding material.

The method can further comprise removing the multiple particles from the opal structure to form an inverse opal structure. In some cases, the removing step can be referred to as "etching". The multiple particles can be removed by generally any method. Removal methods include applying heat, or applying a solvent. The particular choice of solvent or solvents can depend on the material from which the multiple particles are made. For example, multiple particles made of polystyrene or PMMA (Poly-methyl methacrylate) may be removed by application of the tetrahydrofuran solvent. For multiple particles made of silica and titania, the multiple particles can be removed by application of hydrofluoric acid. For multiple particles made of zinc oxide, the multiple particles can be removed by application of hydrochloric acid or sulfuric acid.

The method can further comprise applying a coating layer partially or fully over the opal structure or inverse opal structure. The method can further comprise polymerizing the coating layer. In some examples, the coating layer contains the same material as the solid substrate.

The solid substrate can be treated in generally any manner in order to increase the hydrophilicity of the solid substrate. The solid substrate has an initial hydrophilicity prior to the treatment, and a final hydrophilicity after the treatment, where the final hydrophilicity is greater than the initial hydrophilicity. In certain examples, the initial hydrophilicity is negative (that is, the solid substrate is hydrophobic), and the final hydrophilicity is positive (that is, the solid substrate is hydrophilic). Examples of such treatments include exposure to ultraviolet light, exposure to x-ray radiation, or both. The exposure can be performed for generally any duration of time. Example durations include about 5 minutes, about 10 minutes, about 20 minutes, about 30 minutes, about 40 minutes, about 50 minutes, about 60 minutes, and ranges between any two of these values.

The light-reflective materials can be further processed to change their physical form. For example, a fiber can be woven into a fabric.

EXAMPLES

The following examples are provided to demonstrate various embodiments of the invention. It should be appreciated by those of skill in the art that the techniques disclosed in the examples which follow represent techniques discovered by the inventor(s) to function well in the practice of the invention. However, those of skill in the art should, in light of the present disclosure, appreciate that many changes can be made to the specific embodiments disclosed to obtain a like or similar result without departing from the spirit and scope of the invention.

Example 1

Preparation of Regenerated Silk Fibroin Solution

Figure 15:
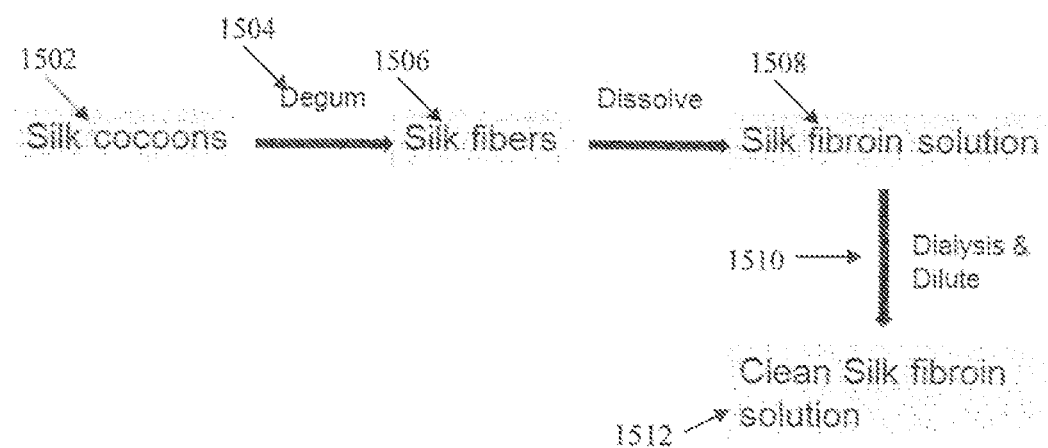
FIG. 15 is a schematic flow diagram illustrating a process to obtain silk fibroin solution.

FIG. 15 is a schematic flow diagram illustrating a process to obtain silk fibroin solution. The process begins with purification of harvested cocoons 1502. The cocoons contain sericin, which binds the silk fibroin filaments together. In operation 1504, sericin was removed from the fibroin strands of the cocoons 1502 by boiling the cocoons in 5 wt % aqueous solution of sodium carbonate for about 45 minutes. The resultant fibroin bundle was then rinsed thoroughly in deionized water multiple times and allowed to dry overnight to form silk fibers/fibroin 1506. The dried silk fibroin 1506 was dissolved in a saturated solution of lithium bromide (about 9.3 M) at about 40° C. for about one hour to form a silk fibroin solution 1508. In operation 1510, the lithium bromide salt was then extracted from the silk fibroin solution 1508 through a water-based dialysis cassette for about 3 days. Remaining particulates were removed through centrifugation (at about 10,000 rpm for about 15 minutes). The process produced a 4% w/v silk fibroin solution of excellent quality and stability. A diluted silk fibroin solution 1512 of about 1% w/v was obtained by diluting the 4% w/v silk fibroin solution.

Example 2

Preparation of a Silk Fibroin Opal Structure

Figure 13:
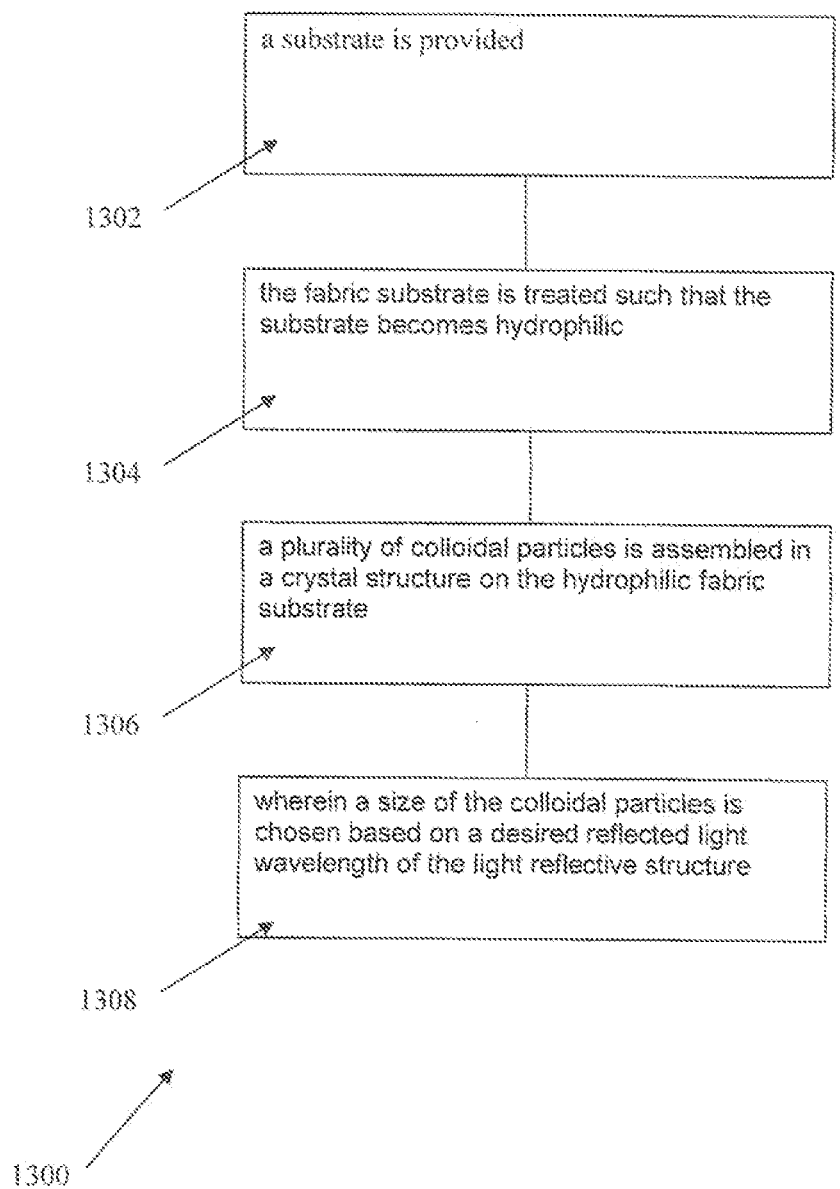
FIG. 13 is a schematic flowchart illustrating a method of forming a light reflective structure in an example embodiment.

A fabric substrate was provided, and illuminated with ultraviolet light for about one hour to increase the hydrophilicity of the fabric. Commercially available monodisperse polystyrene latex spheres in a colloidal suspension were deposited onto the fabric, and allowed to sediment. The suspension was heated to a temperature of about 4° C. for 2-4 hours to remove, solvent and to obtain a colloidal crystal structure on the fabric. This method was effective to produce well-ordered and closely packed layers of particles over large surface areas of fabric by convective self-assembly. This method is diagrammatically shown in FIG. 13.

The regenerated silk fibroin solution of Example 1 was poured over the fabric to allow the silk fibroin to penetrate the voids among the colloidal microsphere particles to produce silk fibroin opal structure 106.

The initial substrate, assembled crystal structure, and opal structure are shown in FIG. 1.

Example 3

Preparation of a Silk Fibroin Inverse Opal Structure

The silk fibroin opal structure of Example 2 was further processed, using the silk fibroin solution effectively as an "etch mask". The polystyrene colloidal particles were etched and removed by treatment with tetrahydrofuran to form a silk fibroin inverse opal structure 108 on the fabric. The conversion of an opal structure to an inverse opal structure is shown in FIG. 1. An additional coating of silk fibroin was applied to the fabric to produce a coating layer on top of the inverse opal structure.

Figure 2:
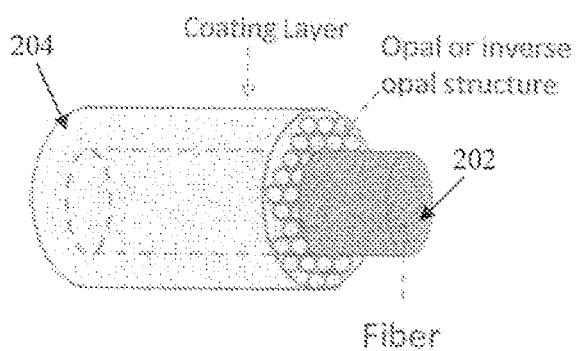
FIG. 2 is a schematic drawing illustrating an opal or inverse opal structure coated on a fiber in an example embodiment.

FIG. 2 shows a three-dimensional view of fibers 202 having an opal or inverse, opal structure, and coated with coating layer 204.

Example 4

Use of Different Sized Colloidal Particles to Form Inverse Opal Structures

Commercially available particles of diameters 240 nm, 500 nm, 600 nm, and 700 nm were used to prepare silk fibroin inverse opal structures having different internal cavity dimensions.

The four different sized materials were analyzed using a scanning electron microscope. It was found that the diameter sizes of the internal spherical cavities shrunk about 20% to 30% as compared to the original sizes of the colloidal particles. For example, use of the 240 nm diameter colloidal particle resulted in an inverse opal structure having inner cavity diameters of about 210 nm. Additionally, it was found that the silk fibroin inverse opals were well described by overlapping shells of silk fibroin due to the three-dimensional assembled structure, with inner air spheres and outer spheres including the silk fibroin shells.

Figure 3:
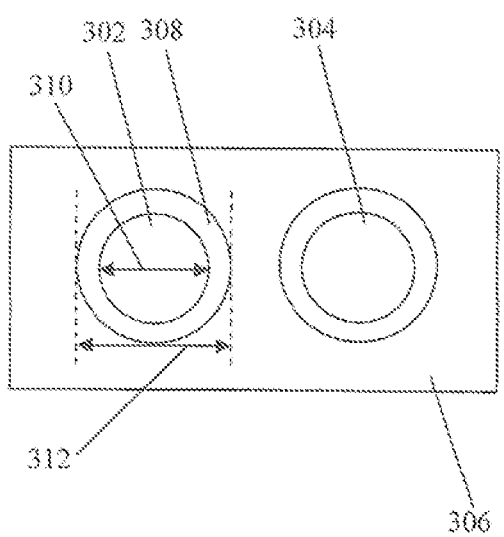
FIG. 3 is a schematic drawing illustrating two air spheres in silk fibroin in an example embodiment.

FIG. 3 illustrates the various spherical cavity sizes of two spheres 302 and 304 in silk fibroin 306. For sphere 302 shown on the left side of the Figure, 308 represents the silk fibroin shell, 310 represents the diameter of the inner sphere ("d"), and 312 represents the diameter of the outer sphere ("D"). The lattice constant for the inverse opal structure is calculated as a=sqrt(2)*D. The lattice constant is the distance between adjacent air spheres of the crystal lattice of the inverse opal structure. Table 1 shows the diameter measurements obtained from the scanning electron microscope images of the inverse opal structures formed from the various colloidal particles.

| Colloidal particle size | Inner sphere (d) diameter | Outer sphere (D) diameter | Lattice constant (a) |
|---|---|---|---|
| 240 nm | 140 nm | 210 nm | 295 nm |
| 500 nm | 380 nm | 430 nm | 605 nm |
| 600 nm | 450 nm | 535 nm | 756 nm |
| 700 nm | 490 nm | 640 nm | 905 nm |

These results show that different inverse opal structures can be readily prepared on silk fabric by varying the particle size of the starting polymer spheres.

Example 5

Scanning Electron Microscope Images

Figure 4:
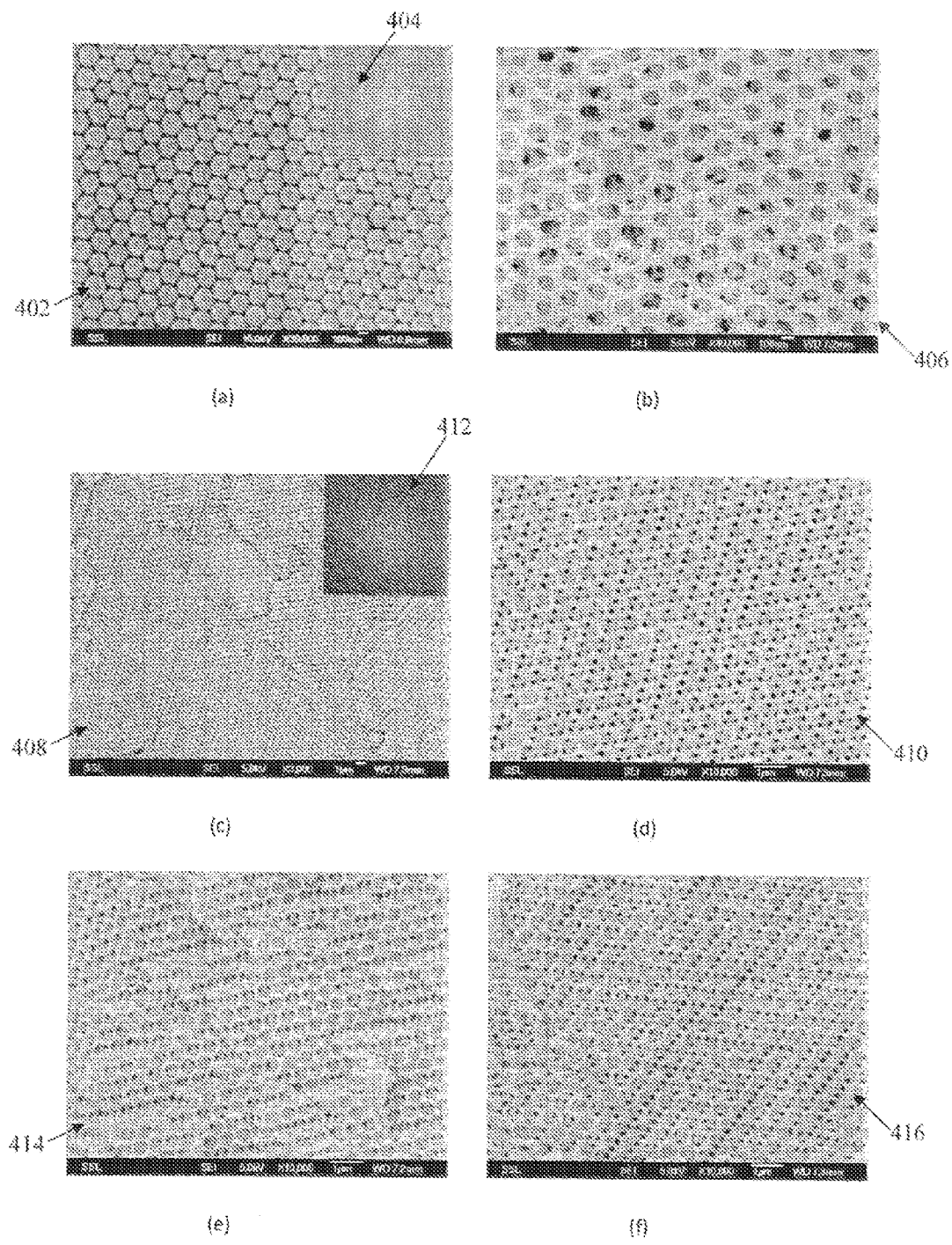
FIG. 4(a) is a scanning electron microscope image of a face-centered cubic (FCC) colloid crystal formed using 240 nm particles in an example embodiment.
FIG. 4(b) is a scanning electron microscope image of silk fibroin inverse opals prepared using the 240 nm colloid crystal from FIG. 4(a).
FIG. 4(c) is a scanning electron microscope image of silk fibroin inverse opals fabricated using 700 nm colloid particles in an example embodiment.
FIG. 4(d) is another scanning electron microscope image of silk fibroin inverse opals fabricated using 700 nm colloid particles in an example embodiment.
FIG. 4(e) is a scanning electron microscope image of silk fibroin inverse opals formed using 600 nm colloid particles in an example embodiment.
FIG. 4(f) is a scanning electron microscope image of silk fibroin inverse opals formed using 500 nm colloid particles in an example embodiment.

FIG. 4(*a*) is a scanning electron microscope image 402 of a face-centered-cubic (FCC) colloid crystal formed on silk fabric using 240 nm particles. The electron beam energy was about 10 kV and the magnification was set at about 30,000 times. The lattice constant calculated for the image 402 is a=sqrt(2)*d=sqrt(2)*240 nm=340 nm. The inset image 404 shows the fast Fourier transformation of the FCC colloid crystal of image 402. The inset image 404 confirms the high quality of the long-range ordered FCC structures.

FIG. 4(*b*) is a scanning electron microscope image 406 of a silk fibroin inverse opal structure prepared using 240 nm colloid particles. The fabrication method was substantially identical to the method described with reference to FIG. 1. The electron beam energy was about 5 kV and the magnification was set at about 40,000 times.

FIGS. 4(*c*) and (*d*) are scanning electron microscope images 408, 410 respectively of a silk fibroin inverse opal structure at different magnifications fabricated using 700 nm colloid particles. The electron beam energy was about 5 kV. The image 408 is shown at 3,000 times magnification and the image 410 is shown at 10,000 times magnification. The inset image 412 shows the Fast Fourier Transformation of the structure of FIG. 4(*c*). The inset image 412 confirms the high quality of the silk fibroin inverse opals.

FIG. 4(*e*) is a scanning electron microscope image 414 of a silk fibroin inverse opal structure formed using 600 nm colloid particles. The fabrication method was substantially identical to the method described with reference to FIG. 1. The electron beam energy was about 5 kV and the magnification was set at about 10,000 times.

FIG. 4(f) is a scanning electron microscope image 416 of silk fibroin inverse opals formed using 500 nm colloid particles. The fabrication method was substantially identical to the method described with reference to FIG. 1. The electron beam energy was about 5 kV and the magnification was set at about 10,000 times.

Example 6

Different Colors Produced by Inverse Opal Structures

Bright field optical microscopy of a 240 nm colloidal crystal showed a green light reflection. An optical microscope image for a silk fibroin inverse opal structure produced using a 240 nm colloidal template showed a purple light reflection. Optical microscope images for silk fibroin inverse opal structures showed the following colored reflections.

| Colloidal particle size | Color visible to the eye |
| --- | --- |
| 240 nm | Purple |
| 500 nm | Purple |
| 600 nm | Green |
| 700 nm | Red |

These results show that different visibly colored fabrics can be readily prepared by varying the particle size of the starting polymer spheres. It is recognized by the inventors that the purple colour observed for the 240 nm silk fibroin inverse opal structure is produced from the first band gap while the purple colour observed for the 500 nm silk fibroin inverse opal structure is produced from the second band gap.

Example 7

Optical Reflection Spectra

Figure 5:
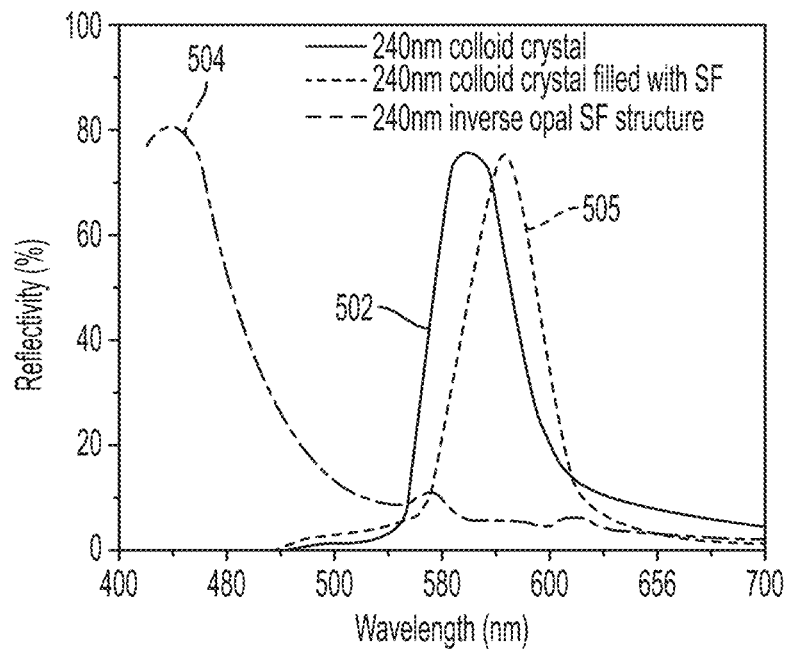
FIG. 5(a) shows optical reflection spectrums for a colloid crystal fabricated using 240 nm colloid particles and for silk fibroin inverse opals fabricated using the colloid crystal at normal light incidence in an example embodiment.
FIG. 5(b) shows optical reflection spectrums for silk fibroin inverse opals fabricated using 500 nm, 600 nm and 700 nm colloid particles at normal light incidence in an example embodiment.
Figure 5:
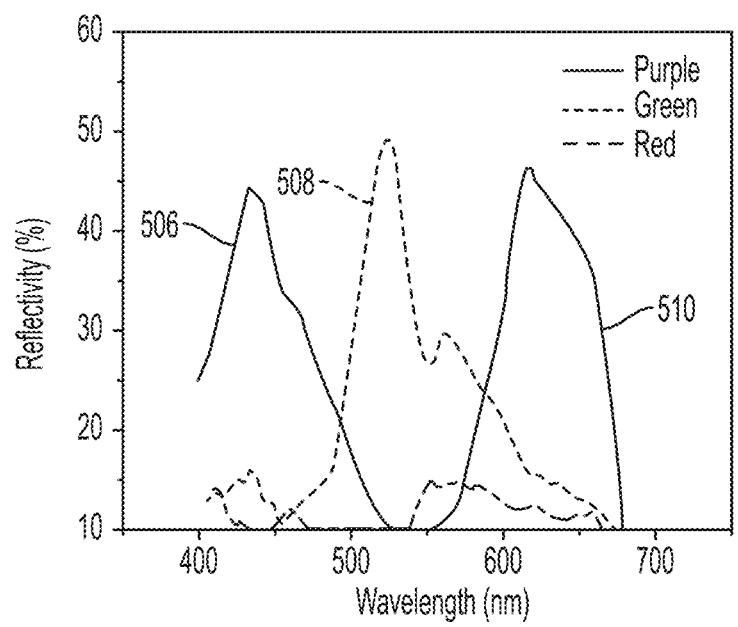

FIG. 5(a) shows optical reflection spectra 502, 504, 505 at normal light. The spectra were measured using an Ocean optics 2000 spectrometer. The Y-axis is the percentage of light that is reflected. The spectrum 502 is for a 240 nm colloid crystal, the spectrum 504 is for a 240 nm silk fibroin inverse opal structure and the spectrum 505 is for a 240 nm silk fibroin opal structure. It was observed that the reflective peak of the colloid crystal spectrum 502 is at about 560 nm which translates to the green color observed. For the silk fibroin inverse opal structure spectrum 504, the position of the reflective peak is about 430 nm, in accordance with the visually observed purple color. For the silk fibroin opal structure spectrum 505, the position of the reflective peak is about 580 nm. Therefore, it can be observed that structural colors can be tuned, for example between a silk fibroin opal structure and a silk fibroin inverse opal structure formed using colloidal particles of the same size. A 240 nm colloid crystal can provide a reflective spectral peak of about 560 nm (green color). By using silk fibroin to penetrate the voids of the 240 nm colloid crystal, the resultant silk fibroin opal structure has a shifted reflective peak at about 580 nm (red color). By etching the colloidal particles to obtain air spheres, the resultant silk fibroin inverse opal structure has a shifted reflective peak at about 430 nm (blue color).

FIG. 5(b) shows optical reflection spectra 506, 508, 510 at normal light incidence. The spectra 506, 508, 510 are for silk fibroin inverse opal structures fabricated using 500 nm, 600 nm and 700 nm colloid particles respectively. It was observed that the peaks of the reflection spectra 506, 508, 510 are at about 430 nm, 520 nm and 610 nm respectively, in accordance with the visually observed purple, green and red colors of such inverse opal structures. Therefore, it can be observed that structural colors can be tuned by varying the sizes of colloidal particles, for example in forming silk fibroin inverse opal structures. The correlation between color and size of colloidal particles can be observed in the spectra of FIG. 5(b).

By comparing the spectra 506, 508, 510 of FIG. 5(b) with the spectra 502, 504, 505 of FIG. 5(a), it was observed that the reflection intensities/reflectivity values are stronger in the spectra 502, 504, 505 of FIG. 5(a) than the spectra of FIG. 5(b). For example, the spectrum 504 has a reflectivity value of about 80% compared to the spectrum 508 having a reflectivity value of about 50%. Although not intending to be bound by theory, the inventors have inferred that the reflective peaks of the spectrums 502, 504, 505 in FIG. 5(a) may relate to and may be the result of the first ordered band-gap of the FCC structures/opals while in FIG. 5(b), the reflective peaks of spectrums 506, 508, 510 may relate to and may be the result of the second ordered band-gap of the silk fibroin inverse opals.

Example 8

Photonic Band Structures

Photonic band structures of the colloid crystals and silk fibroin inverse opal structure are computed using the plane-wave expansion method. Plane wave expansion method (PWE) refers to a computational technique in electromagnetics to solve the Maxwell's equations by formulating an eigenvalue problem out of the equation. This method is commonly used as a method of solving for the band structure (dispersion relation) of specific photonic crystal geometries. The numerical simulations were carried out using commercial software (RSoft Design). The first 20 bands were calculated for both colloid crystals and silk fibroin inverse opals. For the colloid crystals, the colloid particles were considered as close packed. For the silk fibroin inverse opals, the FCC crystals were well described by overlapping shells of silk fibroin, with inner radius 1.0 (touching close-packed air spheres) and outer radius 1.1 in units of the radius of the close-packed spheres.

Figure 6:
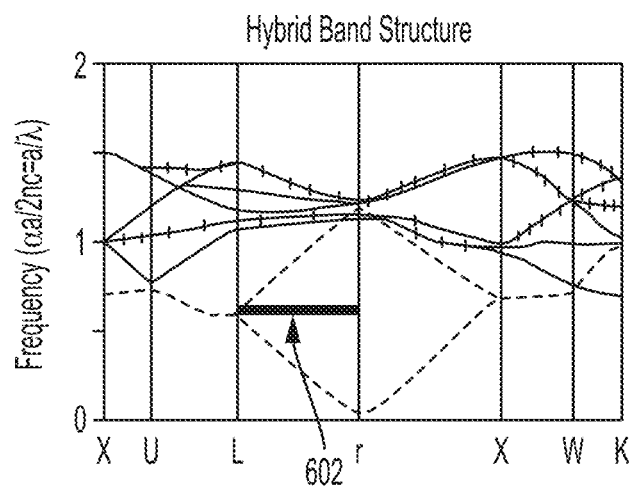
FIG. 6(a) shows the bands structure or colloid crystals along high symmetry directions in the FCC Brillouin zone in an example embodiment.
FIG. 6(b) shows the bands structures for silk fibroin inverse opals in an example embodiment.
Figure 6:
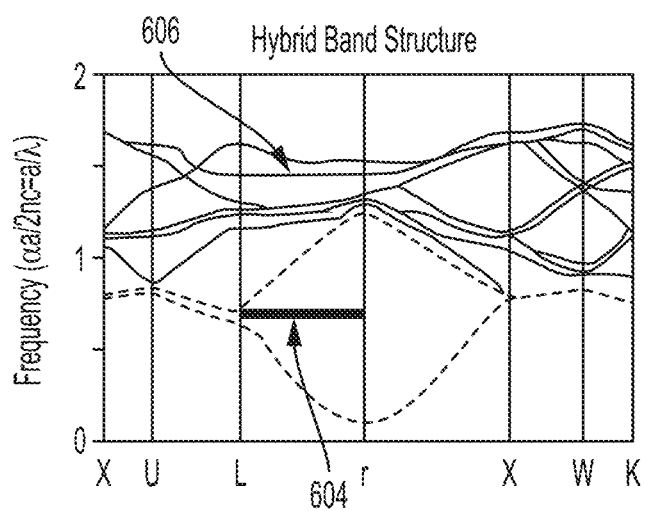

FIG. 6(a) shows the band structure of a colloid crystal along high symmetry directions in the FCC Brillouin zone. The y-axis refers to the frequency of the incident light, x-axis refers to the high symmetry directions in the FCC Brillouin zone of the photonic crystals. The refractive index of colloid particles of the crystal is taken to be about 1.59. From the bands structure of FIG. 6(a), the 3D FCC colloid crystal does not exhibit a complete photonic band-gap. However, a partial photonic band-gap 602 exists along the Γ-L direction (111), and the band gap is located at a frequency that can be found from $a/\lambda=0.6$, where 0.6 is obtained from $1/(1.59)$.

FIG. 6(b) shows the band structures for the silk fibroin inverse opal. The refractive index of silk fibroin is taken to be about 1.497. It was found that there are two hand gaps 604, 606 along the Γ to L direction. That is, there is a higher frequency stop band ($a/\lambda=1.46$) beyond the first order stop gap ($a/\lambda=0.7$, 0.7 is obtained from $1/(1.497)$) between the Γ and L points, which is named as a second order band gap. The value of 1.46 for the second order band gap was obtained from a simulation of the band structures using the commercial software RSoft. These gaps can be directly compared to the reflectivity peaks at normal light incidence.

Table 2 tabulates the theoretical band gap values and the measured reflective peak values of the 240 nm colloid crystal structure and the various inverse silk opals.

| | Theory calculated band gaps | | Measured |
|---|---|---|---|
| | First order band gap | Second order band gap | reflective peaks |
| 240 nm colloid crystals | λ = a/0.6 = 565 nm | No | 560 nm |
| 240 nm silk inverse opal | λ = a/0.7 = 420 nm | λ = a/1.46 = 202 nm | 420 nm |
| 500 nm silk inverse opal | λ = a/0.7 = 865 nm | λ = a/1.46 = 415 nm | 430 nm |
| 600 nm silk inverse opal | λ = a/0.7 = 1043 nm | λ = a/1.46 = 520 nm | 520 nm |
| 700 nm silk inverse opal | λ = a/0.7 = 1243 nm | λ = a/1.46 = 620 nm | 610 nm |

By comparing with the numerical simulation theoretical results and the measurements, it was recognized by the inventors that the green color of the 240 nm colloid crystal structure and the purple color of the 240 nm silk fibroin inverse opal structure are produced by the first band gap of the FCC structures while the respective purple, green and red colors of the 500 nm, 600 nm and 700 nm silk fibroin inverse opal structures arise from the second order band gap of the FCC structures, since it can be clearly seen that their first order band gap wavelengths reside in the infra-red (IR) region, not the visible region.

Therefore, the reflection intensities are stronger in the spectrums 502, 504 of FIG. 5(a) than the spectrums 506, 508, 510 of FIG. 5(b).

In view of the above, the inventors have recognized that silk fibroin inverse opal structures can have different photonic band gaps, e.g. two photonic band gaps along certain directions. Thus, there can be two reflection peaks for silk fibroin inverse opal structures. This can assist in producing mixed structural colors, inclusive of those in the ultraviolet and infra-red wavelength regions. For example, a silk fibroin inverse opal structure can have the first order band gap wavelength for a first color and the second order band gap wavelength for a second color, thus producing mixed structural colors. The location of the first and second order band gap is controlled by the parameters of the photonic crystals. For example, refractive index, lattice constants).

Figure 14:
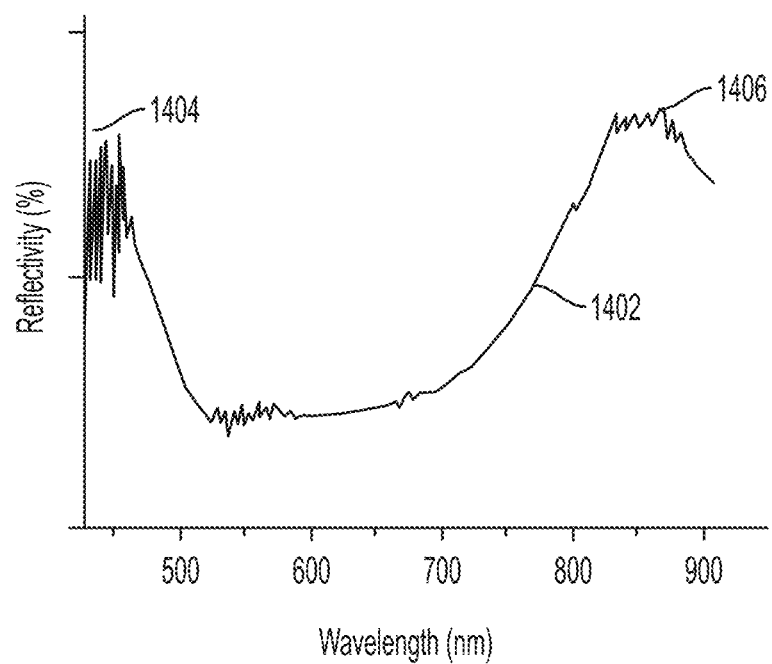
FIG. 14 shows a reflection spectrum of a structural colored silk material formed using a 500 nm inverse opal structure in an example embodiment.

FIG. 14 shows a reflection spectrum 1402 of a structural colored silk material formed using a 500 nm silk fibroin inverse opal structure. There are two peaks 1404, 1406' in the reflection spectrum although the visible color observed is purple. The peak 1404 is located at about 450 nm (purple light) and the peak 1406 is located at about 850 nm (near infrared region). The inventors also recognize that multiple reflections can also be obtained by fabricating different sized opal/inverse opal structures in silk fabric. For example, by fabricating a silk fibroin inverse opal structure using 500 nm colloidal particles and a silk fibroin inverse opal structure using 700 nm colloidal particles together in silk fabric, purple and red light reflections can be obtained.

Example 9

Preparation of Colored Silk Fabric with Protective Coating Layer

In another example, a structural colored silk fabric was prepared. A piece of degummed silk fabric was provided as a fabric substrate. The degumming process is substantially identical to operation 1504 of FIG. 15. As silk fabric is typically hydrophobic, the silk fabric was treated to be more hydrophilic. Alternatively, silk fabric can be treated with ultraviolet light or x-ray until the fabric becomes more hydrophilic. If a water contact angle measurement is equal to or less than sixty degrees, the fabric can be considered hydrophilic. The treatment was approximately one hour in length. The inventors have recognized that making the fabric hydrophilic facilitates the self-assembly of colloid particles on the surface of the silk fabric. Pretreatment may be omitted for fabrics that are already hydrophilic.

Colloidal particles of about 300 nm diameter were crystallized on the surface of the degummed and UV-treated silk fabric. Regenerated silk fibroin was used as a binding material to penetrate the voids between the colloid particles to form a silk fibroin opal structure. The silk fibroin functions as a binding solution to bind/adhere the silk fibroin opal structure or the silk fibroin inverse opal structure to the fabric substrate. If a silk fibroin inverse opal structure is desired as an alternative, the colloid particles can be etched to form air spheres. An additional layer of regenerated silk fibroin can be applied as a coating layer on the silk fibroin opal structure or silk fibroin inverse opal structure on the silk fabric. Pouring the regenerated silk fibroin over the structure was readily performed. The coating layer can perform multiple roles such as reducing color fading, and protecting the structure from physical damage.

The inventors have recognized that the hydrophobicity of silk fabrics/fibers seems to discourage assembly of colloidal particles on the fabrics/fibers. Therefore, a treatment to make the fabric/fiber more hydrophilic is beneficial. The inventors also recognized that structural colors do not bond strongly to fabric/fiber, and colors may therefore fade. Thus in some embodiments, a coating layer of silk fibroin solution may be applied over the colloid crystal on the silk fabric, or as an additional layer on the silk fibroin opal/inverse opal structure, and solidified. The additional silk fibroin layer strongly bonds to the silk fabric/fiber such that the colloid crystal on the silk fabric or silk fibroin opal/inverse opal structure can stay substantially permanently on the fabric and not fade over time. It is also observed that the colors produced are relatively shinier than other forms of color application.

Example 10

Preparation of Colored Silk Fabric Made Using 255 nm Polystyrene Spheres

Figure 7:
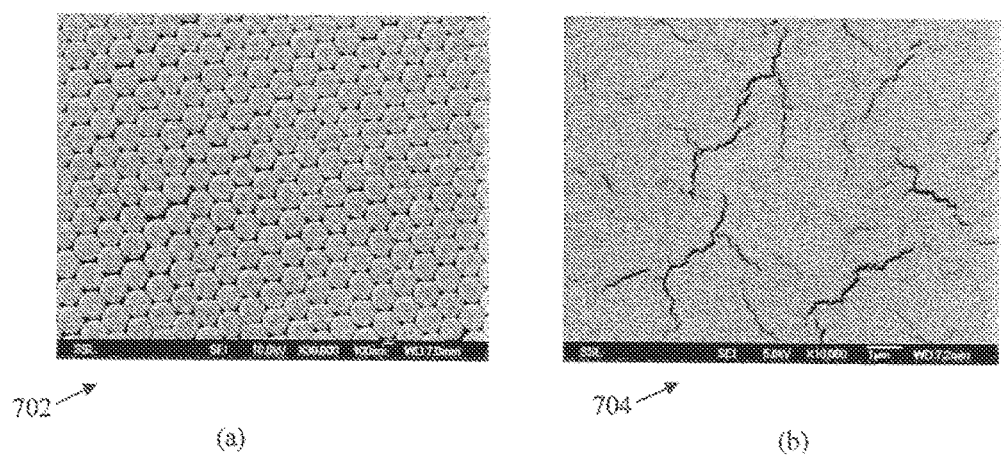
FIG. 7(a) shows a scanning electron microscope image of colloid particles crystallized on the surface of silk fabric in an example embodiment.
FIG. 7(b) shows a scanning electron microscope image of the regenerated silk fibroin coating on the colloid crystal in the example embodiment.

Colloidal polystyrene spheres having a diameter of 255 nm were used to form a FCC structured lattice on silk fabric. FIG. 7(a) shows a scanning electron microscope image 702 of the colloid particles on the silk fabric. The electron beam energy is about 10 kV and the magnification is about 30,000 times. The image 702 shows the (111) face of the colloid crystal and the lattice constant for the crystal is about: a=sqrt(2)*d=sqrt(2)*240 nm=340 nm. FIG. 7(b) shows a scanning electron microscope image 704 of the regenerated silk fibroin coating on the colloid crystal. The resultant structure is a silk fibroin opal structure on the silk fabric. The electron beam energy is about 5 kV and the magnification is about 10,000 times. The inner colloid crystal is surrounded by the silk fibroin layer, which makes the structural color firmly stay on the fabric. The fabric was visibly orange in color.

Example 11

Preparation of Colored Silk Fabric Made Using 240 nm Polystyrene Spheres

Figure 11:
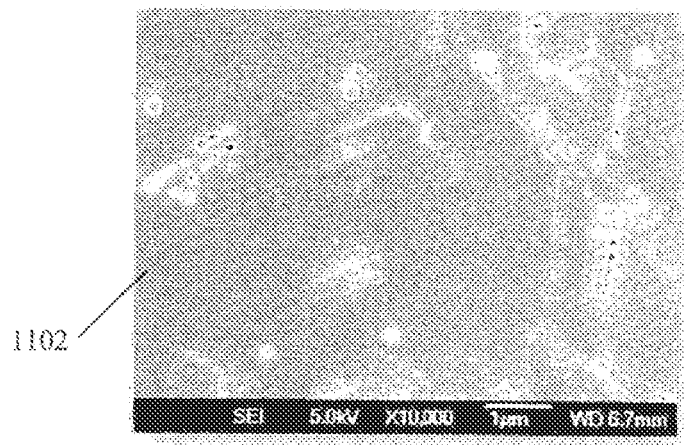
FIG. 11(a) is a scanning electron microscope image of colloid particles imbedded in silk in an example embodiment.
FIG. 11(b) is a scanning electron microscope image of an inverse opal structure imbedded in silk in an example embodiment.
Figure 11:
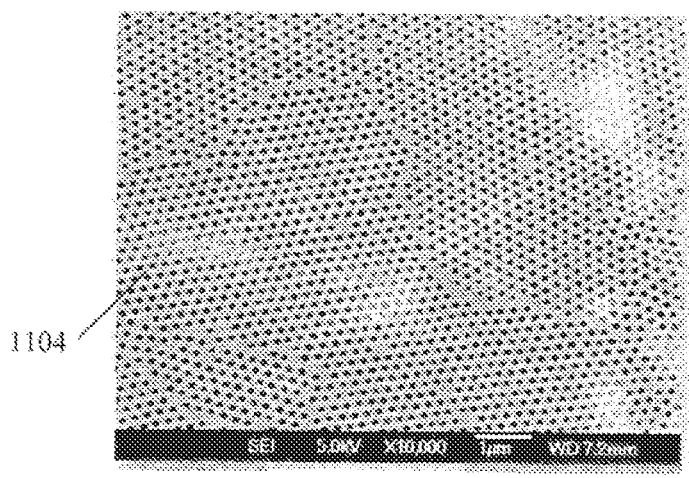

Colloidal polystyrene spheres having a diameter of 240 nm were used to form a FCC structured lattice on silk fabric. FIG. 11(a) is a scanning electron microscope image 1102 of the opal structure. FIG. 11(b) is a scanning electron microscope image 1104 of an inverse opal structure formed by penetrating the voids between the colloid particles with silk fibroin solution and etching the colloid particles with tetrahydrofuran to form air sphere cavities.

Example 12

Preparation of Colored Silk Fabric Made Using 255 nm Polystyrene Spheres

Figure 8:
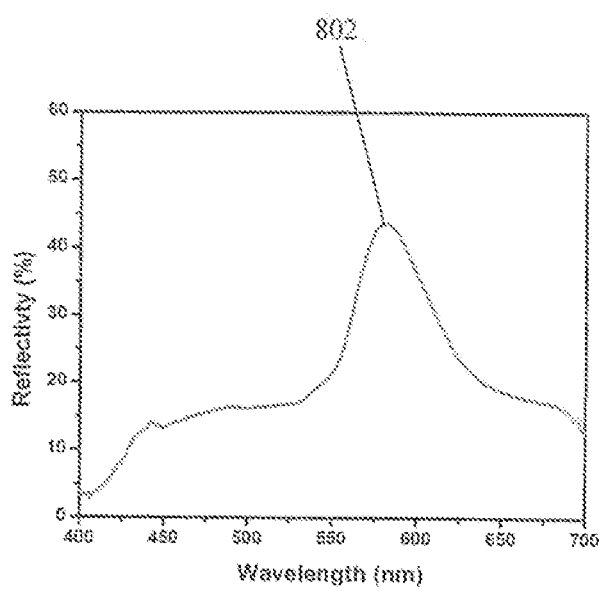
FIG. 8 is a reflective spectrum of the structural colored silk fabric at normal incident light in the example embodiment.

Colloidal polystyrene spheres having a diameter of 255 nm were used to form a FCC structured lattice on silk fabric. FIG. 8 is a reflective spectrum of the structural colored silk fabric at normal incident light of the silk fibroin opal structure on a silk fabric substrate. The reflective peak shown at 802 is at about 580 nm. From the band structures of the colloid crystals, the calculated reflective peak along (111) direction is located at λ=a/0.6=255*sqrt(2)/0.6=about 600 nm, where 0.6 is obtained from 1/(1.59) with 1.59 being the refractive index of the colloid crystal. According to observations and measurements, the structural color exhibited is blue shifted by a small margin, the 20 nm difference between the measured value of about 580 nm and the calculated value of about 600 nm. Although not intending to be limited to any theory, the inventors infer that this may be because of the non-flat surface of the silk fabric. Like most fabrics, the color exhibited may change by varying the angle of viewing.

Figure 9:
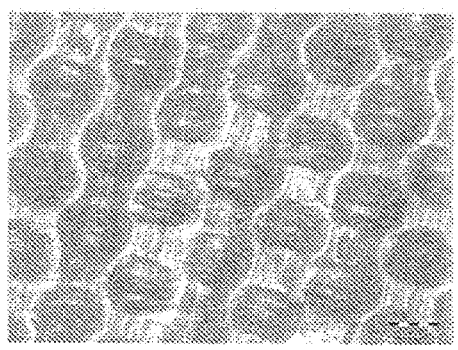
FIGS. 9(a) and (b) show bright field optical microscope images of the structural colored silk fabric at different magnifications in the example embodiment.
Figure 9:

FIGS. 9(a) and (b) show bright field optical microscope images of the structural colored silk fabric at different magnifications in. In accordance with the measured value of about 580 nm, the silk fabric having the silk fibroin opal structure reflects an orange color.

Example 13

Analysis of Silk Material at Various Phases of Manufacture

Colloidal polystyrene beads of 240 nm diameter size were used to first form crystal structures on silk fiber, then silk fibroin was added to form opal structures, which was subsequently converted to an inverse opal structure by dissolving the polystyrene with tetrahydrofuran.

Figure 10:
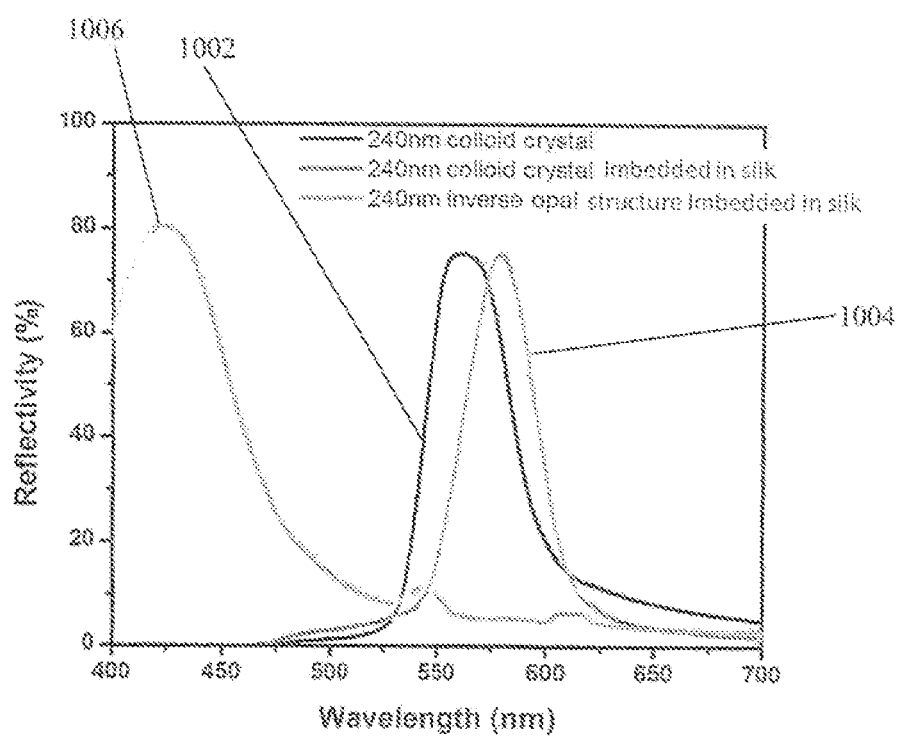
FIG. 10 shows respective optical reflection spectrums for a colloid crystal fabricated using 240 nm colloid particles, a 240 nm colloid crystal imbedded in silk fabric/fiber and a 240 nm inverse opal structure imbedded in silk fabric/fiber at normal light incidence in an example embodiment.

FIG. 10 shows optical reflection spectra 1002, 1004, 1006 at normal light incidence in the example embodiment. The spectrum 1002 is for a conventional 240 nm colloid crystal formed on a silicon substrate, the spectrum 1004 is for a 240 nm colloid crystal on the silk fabric/fiber and the spectrum 1006 is for a 240 nm inverse opal structure on the silk fabric/fiber. It was observed that the reflective peak of the colloid crystal spectrum 1002 was at about 560 nm which translates to a visibly green color. For the spectrum 1004 for the colloid crystal on the silk fabric/fiber, the position of the reflective peak is about 580 nm. For the spectrum 1006 for the inverse opal structure imbedded in the silk fabric/fiber, the position of the reflective peak is about 430 nm.

Silk having the colloidal crystal structure (without added silk fibroin added into the voids between the polystyrene particles) has a reflective peak at 560 nm. Once silk fibroin is added into the voids of the crystals, the reflective peak shifted to about 580 nm, and once the polystyrene is removed to produce an inverse opal structure, the peak shifted to about 430 nm.

Example 14

Preparation of Infrared or Ultraviolet Reflecting Fabric Materials

A photonic crystal was assembled on a silk fabric. By having the photonic band gap of the photonic crystal located in the ultraviolet (UV) or infrared wavelength range, the resultant structural colored silk fabric can advantageously serve as material to make UV or infrared red reflecting/blocking textiles. The photonic crystal was prepared using 155 nm colloidal polystyrene particles and silk fibroin, and has an opal structure.

Figure 12:
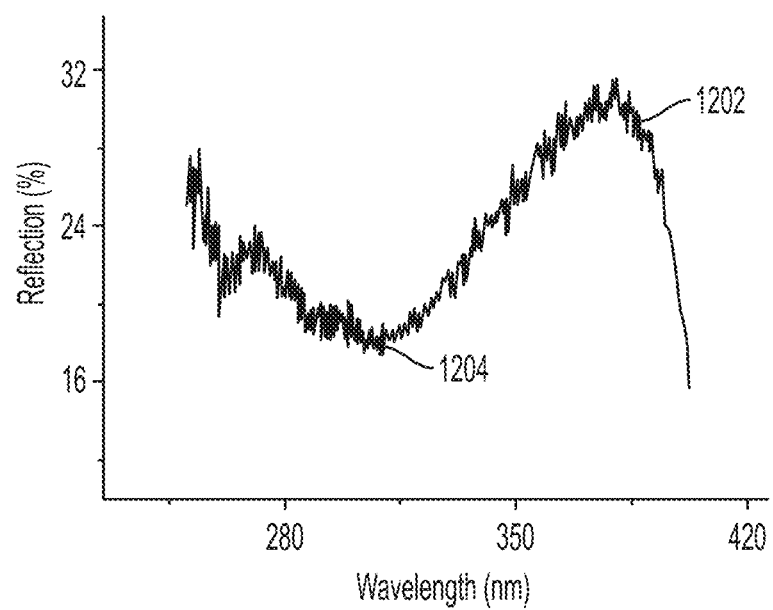
FIG. 12 shows a reflection spectrum of a photonic crystal assembled in a silk fabric in an example embodiment.

FIG. 12 shows a reflection spectrum 1202 of the photonic crystal assembled on a silk fabric substrate. It was observed that the reflective minimum point 1204 is at a wavelength of about 300 nm which is within the UV region. Therefore, the photonic crystal assembled in the silk fabric can be tuned by selecting a colloidal particle size to function to block UV light.

Similarly, colloidal particles could be selected to provide a photonic band gap in the infrared wavelength range. That is, by choosing suitable sized microspheres, the band gap of the photonic crystal can be tuned into the infrared wavelength range (which is more than about 700 nm). For example, for colloid particles made from polystyrene spheres, the bandgap λ=a/0.6, where a is the lattice constant, a=√2*d, and d is the diameter of the colloid particles.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to Which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of forming a light-reflective fabric material, the method comprising:
   providing a fabric substrate;
   treating the fabric substrate by degumming a silk fabric; and
   forming an inverse opal structure on the fabric substrate, wherein forming the inverse opal structure comprises:
      assembling a plurality of particles to form a crystal structure on the fabric substrate, wherein a size of the plurality of particles is selected based on at least two desired reflected light wavelengths of the light-reflective fabric material to be formed;
      applying a first binding material comprising a silk fibroin to the crystal structure such that voids at least partially surrounding the plurality of particles are at least partially filled with the first binding material so that the crystal structure is substantially bound to the fabric substrate;
      applying a second binding material over the crystal structure, wherein the second binding material is different from the first binding material;
      etching the plurality of particles to form the inverse opal structure comprising the silk fibroin, wherein etching the plurality of particles causes the inverse opal structure to have a shifted reflective peak; and
      applying a coating layer over the inverse opal structure, wherein the coating layer material comprises at least one of a polymer, silk, polyester, silica, titania, and PMMA (Poly-methyl methacrylate).

2. The method of claim 1, wherein treating the fabric substrate comprises treating the fabric substrate such that the fabric substrate becomes more hydrophilic or becomes hydrophilic.

3. The method of claim 2, wherein treating the fabric substrate further comprises exposing the fabric substrate to ultraviolet light, x-ray radiation, or both.

4. The method of claim 1, wherein assembling the plurality of particles comprises further selecting the size of the plurality of particles based on a refractive index of the first binding material.

5. The method of claim 1, wherein applying the first binding material comprising the silk fibroin to the crystal structure further comprises selecting the crystal structure having a periodic structure selected from the group consisting of a face-centered cubic (FCC) structure, a hexagonal close packed structure (HCP), a body centered cubic structure, and a simple cubic structure.

6. The method of claim 1, wherein assembling the plurality of particles is based on convective self-assembly.

7. The method of claim 1, wherein assembling the plurality of particles comprises assembling the plurality of particles having one of the group consisting of polystyrene spheres, biodegradable colloidal spheres, silica colloidal spheres, titania colloidal spheres, and protein colloidal spheres.

8. The method of claim 1, wherein at least one desired reflective light wavelength of the at least two desired reflected light wavelengths is a visible light wavelength, an ultraviolet light wavelength, or an infra-red light wavelength.

9. The method of claim 1, wherein the inverse opal structure comprises a plurality of close-packed voids arranged in the crystal structure surrounded by walls of the first binding material.

\* \* \* \* \*

UNITED STATES PATENT AND TRADEMARK OFFICE
CERTIFICATE OF CORRECTION

PATENT NO. : 9,733,393 B2  
APPLICATION NO. : 13/148208  
DATED : August 15, 2017  
INVENTOR(S) : Liu et al.

Page 1 of 1

It is certified that error appears in the above-identified patent and that said Letters Patent is hereby corrected as shown below:

In the Specification

In Column 2, Line 32, delete "structure or" and insert -- structure of --, therefor.

In Column 4, Line 5, delete "The substrate" and insert -- The solid substrate --, therefor.

In Column 6, Lines 1-2, delete "binding, material" and insert -- binding material --, therefor.

In Column 7, Line 29, delete "4° C." and insert -- 40° C. --, therefor.

In Column 7, Line 29, delete "remove, solvent" and insert -- remove solvent --, therefor.

In Column 7, Line 56, delete "inverse, opal" and insert -- inverse opal --, therefor.

In Column 10, Line 64, delete "two hand" and insert -- two band --, therefor.

In Column 11, Line 57, delete "For example," and insert -- (for example, --, therefor.

In Column 14, Line 59, delete "Which" and insert -- which --, therefor.

Signed and Sealed this  
Twenty-eighth Day of November, 2017

Joseph Matal  
*Performing the Functions and Duties of the*  
*Under Secretary of Commerce for Intellectual Property and*  
*Director of the United States Patent and Trademark Office*